United States Patent [19]

Rasp et al.

[11] 4,151,262
[45] Apr. 24, 1979

[54] PROCESS FOR THE CATALYTIC CONVERSION OF ORGANIC CHLORINE COMPOUNDS

[75] Inventors: Christian Rasp, Cologne; Gerhard Scharfe, Leverkusen, both of Fed. Rep. of Germany

[73] Assignee: Bayer Aktiengesellschaft, Leverkusen, Fed. Rep. of Germany

[21] Appl. No.: 868,551

[22] Filed: Jan. 11, 1978

[30] Foreign Application Priority Data

Feb. 1, 1977 [DE] Fed. Rep. of Germany ....... 2703984

[51] Int. Cl.$^2$ ........................... C01B 7/00; B01J 8/00; C01B 7/08
[52] U.S. Cl. .................................. 423/240; 423/245; 423/481
[58] Field of Search ............... 423/240, 245, 437, 481, 423/488

[56] References Cited

U.S. PATENT DOCUMENTS

| 3,377,269 | 4/1968 | Bloch | 423/245 |
|---|---|---|---|
| 3,972,979 | 8/1976 | Kageyama | 423/240 |
| 3,988,423 | 10/1976 | Ohrui et al. | 423/245 |
| 4,025,605 | 5/1977 | Dalton, Jr. et al. | 423/240 |
| 4,053,557 | 10/1977 | Kageyama | 423/481 |
| 4,059,676 | 11/1977 | Yang et al. | 423/481 |

FOREIGN PATENT DOCUMENTS 2536171  2/1976  Fed. Rep. of Germany ........... 423/245

OTHER PUBLICATIONS

Bond et al., Catalysed Destruction of Chlorinated Hydrocarbons, J. Appl. Chem., Biotechnol., 1975, vol. 25, pp. 241–248.

Primary Examiner—O. R. Vertiz
Assistant Examiner—Gary P. Straub
Attorney, Agent, or Firm—Sprung, Felfe, Horn, Lynch & Kramer

[57] ABSTRACT

A process has been developed for the catalytic conversion of organic chlorine compounds into carbon dioxide and hydrogen chloride, using molecular oxygen, in which process the catalyst system is provided by using platinum in a first catalyst zone and palladium in a second catalyst zone.

9 Claims, No Drawings

PROCESS FOR THE CATALYTIC CONVERSION OF ORGANIC CHLORINE COMPOUNDS

The present invention relates to a process for the catalytic conversion of organic chlorine compounds into carbon dioxide and hyrdogen chloride, using molecular oxygen.

It is already known to remove organic compounds consisting of the elements carbon, hydrogen and, optionally, oxygen from gases by converting them into carbon dioxide and water by oxidation with molecular oxygen in the presence of catalysts. This process is described in the literature as catalytic after-burning. Suitable catalysts for the catalytic after-burning are, in particular, noble metals of the eighth group of the Periodic System according to Mendeleev, such as palladium and platinum. They are preferably used in the form of supported catalysts (Industrial Engineering Chemistry, 53, page 809-812 (1961). Aluminium oxide is a suitable support for the noble metals of the eight group of the Periodic System according to Mendeleev.

It is also known (Chemie Ingenieur Technik 37, No. 9, page 891-893, 1965), that the process of catalytic after-burning cannot be applied to chlorohydrocarbons since phosgene is also formed as an oxidation product here at the high temperatures which are required for a reaction with oxygen, so that in such a case the off-gases of the after-burning are more unpleasant than the process off-gases themselves. In a more recent literature source (Journal Appl. Chemical Biotechnologie, 25, page 241, to 248 (1975) it is shown that the catalytic conversion of chlorinated hydrocarbons into carbon dioxide, hydrogen chloride and water can be carried out without the formation of phosgene when hydrogen is additionally added in the form of a hydrocarbon. The reaction of carbon tetrachloride and propylene according to the following equation is given as an example:

$$2\ CCl_4 + C_3H_8 + 5\ O_2 \rightarrow 5\ CO_2 + 8\ HCl$$

The catalytic conversion of the chlorinated hydrocarbons into hydrogen chloride and $CO_2$ can be carried out on a platinum/aluminium oxide catalyst at 450° C. Catalysts which contain 0.2 and 0.5% by weight of platinum gave a 32% and 68-75% conversion respectively. When the catalyst contains 0.8% by weight or more of platinum, the conversions generally exceed 95%.

In principle, this process which has hitherto been disclosed offers the possibility of reacting organic chlorine compounds with molecular oxygen on catalysts containing platinum at temperatures of about 450° C. to give carbon dioxide and hydrogen chloride. The hydrogen chloride can be removed from the reaction gas by means of a flue gas wash (using water or sodium hydroxide solution) and in this manner a clean off-gas is obtained which is virtually free from organic carbon compounds and organic chlorine compounds and can thus be released into the atmosphere.

Because of the high price of the noble metals of the platinum group, it is of interest industrially to develop catalysts or catalyst systems of high catalytic activity with a low noble metal content, for example 0.1% by weight of noble metal, for the catalytic conversion of organic chlorine compounds into carbon dioxide and HCl.

An improved process has now been found for the catalytic conversion of organic chlorine compounds into carbon dioxide and hydrogen chloride, using molecular oxygen, which is characterised in that a gas containing the organic chlorine compounds and molecular oxygen is passed, at elevated temperature, over a catalyst system which has a catalyst zone A containing platinum and a catalyst zone B containing palladium, and in that the gas is first passed through catalyst zone A and then through catalyst zone B. The catalysts of zone A, which contain platinum, and the catalysts of zone B, which contain palladium, can be prepared in a manner which is in itself known.

In general, catalyst zones A and B contain the noble metals in the form of supported catalysts. These can be employed, for example, as loose catalysts in which the catalysts are in the shape of beads or extruded particles, customary particles sizes being 2-6 mm. They can also be used in the form of honeycombed tube catalysts, a typical shape of honeycombed tube catalyst being a six-sided prism, traversed by longitudinal channels, with a diameter of 5 cm and a length of 10 cm and a diameter of the bores of 2 mm. The customary support materials can be used as the support for the catalysts, for example aluminium oxides, silicon dioxides, aluminium silicates and lithium aluminium spinel. Suitable contents of the noble metals platinum and palladium are 0.5 to 5 g of noble metal per litre of catalyst, for example 1-2 g of noble metal per litre of catalyst. In a preferred embodiment of the process, catalysts are used in which the noble metal is concentrated in the surface layer of the catalyst and in which the noble metal content is about 0.1% by weight.

Suitable feed products for the catalytic after-burning of organic chlorine compounds are gases which contain molecular oxygen and organic chlorine compounds containing the elements C, H, O, Cl and, optionally, N and S. The feed gas can also contain inorganic gases, such as, for example, nitrogen, carbon dioxide and HCl. Gases which have a calorific value such that the adiabatic increase in temperature does not, in general, exceed 300° C. are preferably used. In general, gases which have a content of organically bonded chlorine of about 10 mg/Nm³ to 10,000 mg/Nm³, preferably about 50 to 5,000 mg/Nm³ and particularly preferably about 30 to 3,000 mg/Nm³, relative to the feed gas, are employed in the process according to the invention. In order to make a complete conversion of the organically bonded chlorine into HCl possible, gases in which at least 1 H atom is contained per 1 chlorine atom are used. Suitable ratios of hydrogen to chlorine are 1-100 H atoms per 1 Cl atom, for example about 5-40 or about 10-20 H atoms per 1 Cl atom. The conversion can be carried out under normal pressure, under reduced pressure or under elevated pressures. Suitable temperatures for the conversion are about 300°-700° C., for example about 350°-550° C. or about 400°-500° C.

The volume ratio of zone A to zone B can be varied in the ratio about 5:1 to 1:5. Suitable volume ratios are about 2:1 to 1:2 or 1:1. In a preferred embodiment of the process, catalysts which contain about 1 g of noble metal per litre of catalyst are used in zone A and B. The space velocity can vary within wide limits; it can be about 1,000 to 50,000 Nm³ of feed gas per m³ of catalyst, for example about 5,000 to 25,000 or about 10,000 to 20,000 Nm³ of feed gas per m³ of catalyst. The organic chlorine compounds to be converted can be employed in the pure form or as mixtures. If the ratio in the organic chlorine compounds to be reacted is less than 1, compounds containing organically bonded hydrogen are to be added, and in particular in an amount which gives a ratio of H:Cl in the mixture of at least 1. For example, in the burning of chloroform ($CHCl_3$) at least 1 mol of methyl chloride ($CH_3Cl$) per mol of $CHCl_3$ can be added, so that the mixture of the chlorinated compounds has a H:Cl ratio of at least 1.

The most diverse organic chlorine compounds can be employed in the process according to the invention, for example aliphatic chlorine compounds with about 1 to 50, preferably about 1 to 20, carbon atoms, for example, chlorinated alkanes or alkenes, such as carbon tetrachloride, chloroform, methylene chloride, methyl chloride, chloroethane, dichloroethane, dichloropropane, trichlorobutenes, chloropropene, dichlorobutadiene, vinyl chloride, hexyl chloride and dodecyl chloride; furthermore cycloaliphatic, such as cycloalkyl or cycloalkenyl chlorohydrocarbons with 5 to 12, preferably 5 to 7, carbon atoms or aromatic, such as monocyclic or bicyclic carbocyclic chlorohydrocarbons with 6 to 14, preferably 6 to 10, carbon atoms, such as cyclohexyl chloride, cyclohexenyl chloride, chlorobenzene, dichlorobenzene, tetrachlorobenzene, hexachlorobenzene, dichloronaphthalene and monochlorinated or polychlorinated biphenyls; as well as organic chlorine compounds containing oxygen with 1 to 14, preferably 2 to 10, carbon atoms, for example chlorinated alkane or alkene carboxylic acids corresponding to the above-mentioned chlorinated alkanes or alkenes, such as chloroacetic acid and chlorinated monocyclic or bicyclic carbocyclic phenolic compounds, such as chlorophenol or chloronaphthol.

In the broadest sense, unknown organic chlorine compounds and mixtures of organic compounds containing organically bonded chlorine, in which the presence of organically bonded chlorine has been demonstrated by analysis and a ratio of organically bonded hydrogen to organically bonded chlorine of at least 1 atom of hydrogen per 1 atom of chlorine has been ensured, can be converted.

The gases obtained during the conversion are in general freed from hydrogen chloride by a flue gas wash and then analysed with respect to their content of organically bonded carbon and organically bonded chlorine. Apparatuses, which have been specially developed for monitoring waste air, in which the content of carbon, in mg, per $Nm^3$ of gas is determined, with the aid of a flame ionisation detector, and recorded, are particularly suitable for determining the content of organically bonded carbon in the off-gas. These apparatuses permit the determination of extremely low contents of organic carbon, for example in the region of 1 mg or carbon per $Nm^3$ of gas. The determination of the residual content of organic chlorine can be carried out by subjecting a part stream of the off-gas to a thermal after-burning at about 1,050° C. In this procedure, residual amounts of organically bonded chlorine are converted into hydrogen chloride, so that the subsequent analytical determination of hydrogen chloride formed makes it possible to determine the organically bonded chlorine in the off-gas. It is possible, with the aid of these apparatuses, to check that any regulations with regard to the content of organic carbon and organic chlorine in the off-gas when it is released into the atmosphere are observed. For example, on the basis of such regulations it could be demanded that the content of organically bonded carbon is less than 10 mg of carbon per $Nm^3$ of gas and the content of organically bonded chlorine is less than 30 mg of chlorine per $Nm^3$ of gas. Using the process according to the invention, it is possible to achieve these values in an econimically advantageous manner.

Using the customary catalysts, containing 0.1% by weight of platinum or 0.1% by weight of palladium, on supports, such regulations can only be fulfilled when the content of organic chlorine compounds in the feed is very low. At higher contents of organic chlorine compounds, which frequently occur in practice, the values mentioned above are achieved neither with platinum catalysts nor with palladium catalysts. It must be described as being distinctly surprising that connecting two catalyst zones, the first of which contains a platinum catalyst and the second of which contains a palladium catalyst, in series gives an unexpected increase in the activity:
- Higher conversions of organically bonded carbon and higher conversions of organically bonded chlorine are obtained; and
- the formation of higher chlorinated organic compounds, which is observed, in particular, when platinum is used, is avoided.

EXAMPLE 1 (for comparison)

440 ml of a catalyst, which contains 5 g of platinum on 1 l of aluminium oxide beads of 3–5 mm diameter, are put into an adiabatic experimental reactor with an internal diameter of 30 mm. A nitrogen/oxygen mixture with an oxygen content of 10 vol. % is passed over the catalyst at the rate of 5.5 $Nm^3$/hour. The gas is preheated to 400° C., so that the catalyst entry temperature is 400° C. A mixture of ethyl acetate and chlorobenzene in the molar ratio 2:1, corresponding to an empirical formula $C_{14}H_{21}O_4Cl$, is added to this nitrogen/oxygen stream in such an amount that the adiabatic increase in temperature is 100° C. and the final catalyst temperature is 500° C. The content of organically bonded carbon in the reaction gas was determined as 10 mg $C/Nm^3$. It was also ascertained that 95% of the organically bonded chlorine was converted into HCl. The CO content was less than 100 ppm.

EXAMPLE 2 (for comparison)

The procedure followed was as in Example 1, but a catalyst was used which contained 1 g of palladium/1 of catalyst instead of 5 g of platinum/1 of catalyst. It was found, by analysis, that the content of organically bonded carbon in the off-gas was 130 mg $C/Nm^3$. The conversion of organically bonded chlorine was 95%. The content of carbon monoxide was less than 100 ppm.

EXAMPLE 3

The procedure followed was as in Example 1, but the gas was passed first through a catalyst zone A, which had a volume of 220 ml and contained a supported catalyst containing 1 g of platinum/1 of catalyst, and through a catalyst zone V, which had a volume of 220 ml and contained a supported catalyst containing 1 g of palladium/1 of catalyst. The content of organically bonded carbon in the off-gas was less than 1 mg $C/Nm^3$. The conversion of organically bonded chlorine into HCl was 99.3%. The CO content was less than 100 ppm.

The example shows that a significant improvement in the conversion of organically bonded chlorine and organically bonded carbon is achieved when, instead of using catalysts which contain only platinum or only palladium, a catalyst system is used in which the gas is passed first through a catalyst zone containing a platinum catalyst and then through a catalyst zone containing a palladium catalyst, the average nobel metal content of the catalyst system being identical to or smaller than that used when a single catalyst system with platinum or palladium is employed.

What is claimed is:

1. Process for the catalytic conversion of organic chlorine compounds or mixtures of organic chlorine compounds which contain at least 1 atom of hydrogen per 1 chlorine atom into carbon dioxide and hydrogen chloride, using molecular oxygen, in the gas phase at elevated temperature in the presence of noble metal catalysts, which comprises passing a gas containing the said organic chlorine compounds or mixtures and molecular oxygen at elevated temperature from about 300°–700° C., over a catalyst system which has a catalyst zone A containing a platinum CATALYST AND VIRTUALLY NO OTHER CATALYTIC COMPONENT and a catalyst zone B containing a palladium Catalyst And Virtually No other Catalytic Component, and in which the gas is first passed through catalyst zone A and then through catalyst zone B.

2. Process according to claim 1, characterized in that the catalyst zones A and B contain the noble metals in the form of supported catalysts.

3. Process according to claim 2, characterized in that the catalyst zones A and B contain the noble metals on aluminium oxide as the support.

4. Process according to claim 2, characterized in that the catalyst zones A and B contain the noble metals concentrated in the surface layer of the support.

5. Process according to claim 1, characterized in that the volume ratio of zone A to zone B is about 5:1 to 1:5.

6. Process according to claim 1, characterized in that the volume ratio of zone A to zone B is about 2:1 to 1:2.

7. Process according to claim 1, characterized in that catalyst zone A and catalyst zone B each have a noble metal content of about 0.5–2 g of noble metal per liter of catalyst.

8. Process according to claim 1, characterized in that the conversion is carried out at temperatures from about 400°–500° C.

9. Process according to claim 1, characterized in that a gas with a content of organically bonded chlorine of about 30 to 3,000 mg/Nm$^3$ is employed.

* * * * *